Jan. 6, 1948.                L. R. RUNKLE                 2,433,959
                          STUD DRIVING MACHINE
                    Filed July 29, 1944          5 Sheets-Sheet 1

INVENTOR.
Lorin R. Runkle
BY
ATTORNEYS.

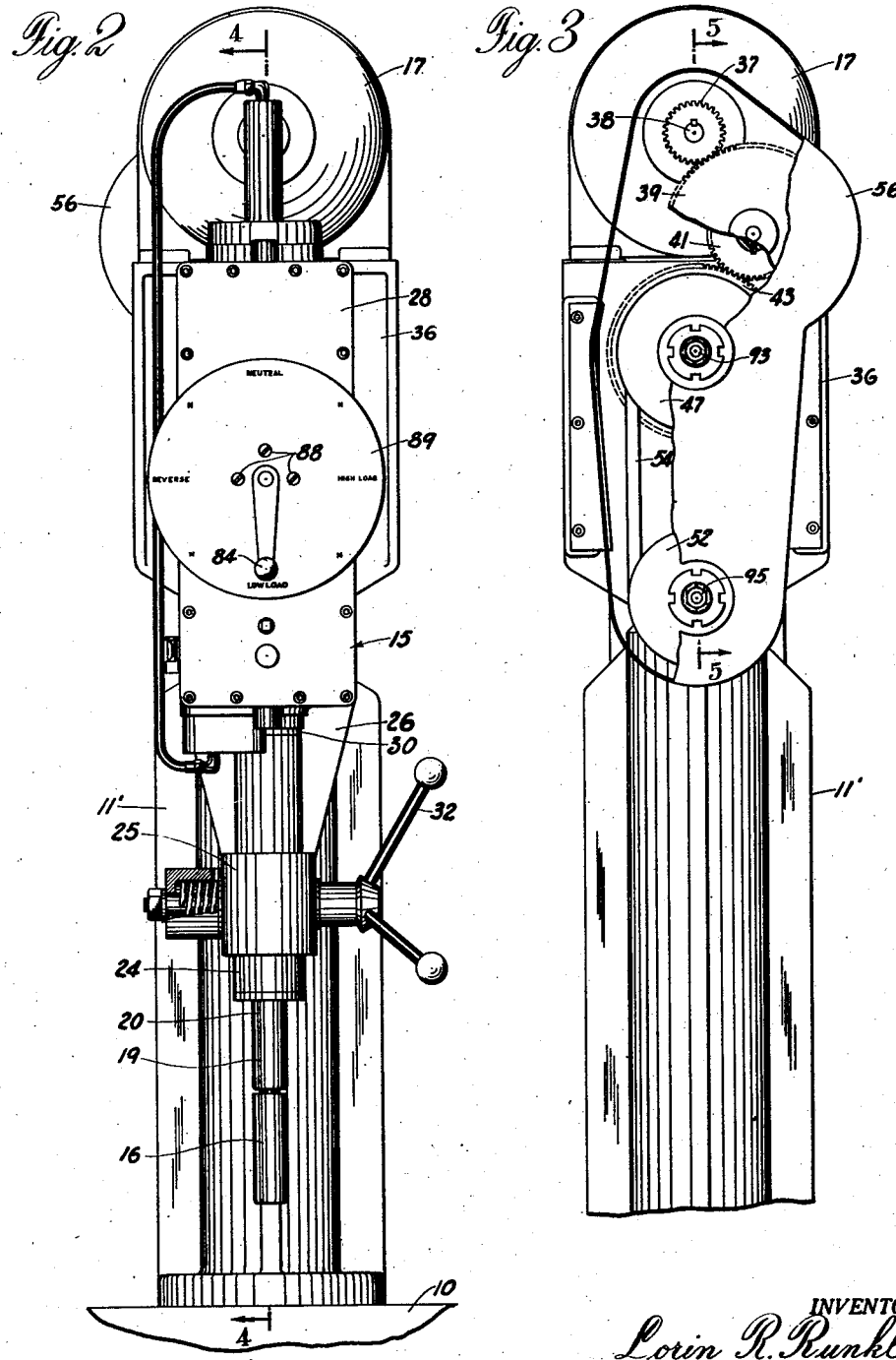

Jan. 6, 1948.  L. R. RUNKLE  2,433,959
STUD DRIVING MACHINE
Filed July 29, 1944  5 Sheets-Sheet 3

INVENTOR.
Lorin R Runkle
BY
Owen, Jackson, Boettcher & Dienner
ATTORNEYS.

Jan. 6, 1948.　　　　L. R. RUNKLE　　　　2,433,959
STUD DRIVING MACHINE
Filed July 29, 1944　　　　5 Sheets-Sheet 5

INVENTOR.
Lorin R. Runkle
BY
Owen, Jackson, Britteles & Dienner
ATTORNEYS

Patented Jan. 6, 1948

2,433,959

UNITED STATES PATENT OFFICE 2,433,959

STUD DRIVING MACHINE

Lorin R. Runkle, South Bend, Ind., assignor to The Studebaker Corporation, South Bend, Ind., a corporation of Delaware Application July 29, 1944, Serial No. 547,221

5 Claims. (Cl. 81—57)

1

This invention relates to a stud driving machine.

While the machine which I shall describe hereinafter in connection with the drawings is adapted for screwing studs into holes, for example, in the cylinder block of an internal combustion engine or similar device wherein plates or auxiliary devices or other parts are to be fastened to the engine block, or wherein a cylinder head is to be applied for ready removal and replacement, it is to be understood that the machine of the present invention is not limited to such use but may be employed for driving studs into other parts, as desired.

The studs which may be threaded at both ends, as known in the art, must fit tightly in the holes into which they are screwed. Commonly, for example, the studs are not intended to be removed after having been screwed into the holes provided for them. A tight fit is therefore required and, at the same time, the fit must not be so tight that the studs cannot be screwed fully into place, or so tight that the studs might be injured in screwing them into the part to which they are to be applied.

One of the main objects of the present invention is to provide an improved form of stud driving machine of the class described which will assure the desired tightness of fit of the studs in the holes to which they are applied, and which machine is adapted expeditiously to secure the desired results and is safe and simple to operate.

Another object of the invention is to provide a stud driving machine which is operable in a manner that enables determining readily and selectively whether the stud will fit too loosely or too tightly or not at all in the opening into which it is to be screwed, so that studs which do fit too loosely or too tightly or not at all in these openings may be discarded and only studs having the desired tightness of fit applied.

Another object of the invention is to provide an improved stud driving machine having a stud driving member, driving means for said member; means responsive to the torque applied in driving the stud into place for disconnecting the driving means from the stud driving member when the resistance encountered by the stud is less than the minimum resistance for securing the desired tightness of fit of the stud, and torque responsive means adapted for disconnecting or releasing the driving means from the stud driving member when the resistance encountered by the stud exceeds the desired maximum resistance. More particularly, the machine illus-

2 trated in the drawings has a stud driving member, suitable driving means for said member, a plurality of driving connections between the driving means and the stud driving member, with torque responsive means for releasing one of the driving connections when a relatively low resistance is encountered by the stud in screwing it into place, torque responsive means for releasing the other driving connection when a greater or relatively high resistance is encountered by the stud, and means for selectively setting the machine for operation of the stud driving member through either of said driving connections.

Another object of the invention is to provide a stud driving machine of the class described in which one of the above mentioned driving connections between the driving means and the stud driving member is released when the resistance encountered by the stud in screwing it into place is less than the minimum resistance for securing the desired tightness of fit of the stud and in which the other driving means is released when the resistance exceeds the desired maximum resistance to screwing the stud into place.

Another object of the invention is to provide a machine in which the resistances at which the driving connections between the driving means and the stud driving member is released may be quickly and easily adjusted.

Another object of the invention is to provide, in a stud driving machine of the class described, the features set forth combined with a reversible driving connection adapted, for example, for unthreading the stud driving member from the exposed or outer threaded end of the stud where the stud is threaded at both ends or, if desired, for unscrewing, from the part to which it has been applied, a stud which has been started into its hole but which fits too loosely or too tightly therein.

Another object of the invention is to provide an improved form of control for selectively and conveniently setting into operation the low load or low torque, as well as the high load or high torque, and reverse driving connections between the driving means and the stud driving member; also for setting the machine in neutral.

Another object of the invention is to provide, in a machine of the class described, an improved carrier for the stud driving mechanism, which carrier is mounted for simple and convenient adjustment horizontally and vertically to bring the stud driving member of the machine to the desired position for driving the stud at the place where it is to be applied.

Further objects and advantages of the invention will appear from the following detailed description, taken in connection with the accompanying drawings which illustrate the manner of constructing and operating a machine in accordance with the present invention.

In the drawings:

Figure 2 is a fragmentary end view of the machine looking from the left hand end as the machine is viewed in Figure 1;

Figure 3 is a fragmentary end view of the machine looking from the right hand end as the machine is viewed in Figure 1;

Figure 1:
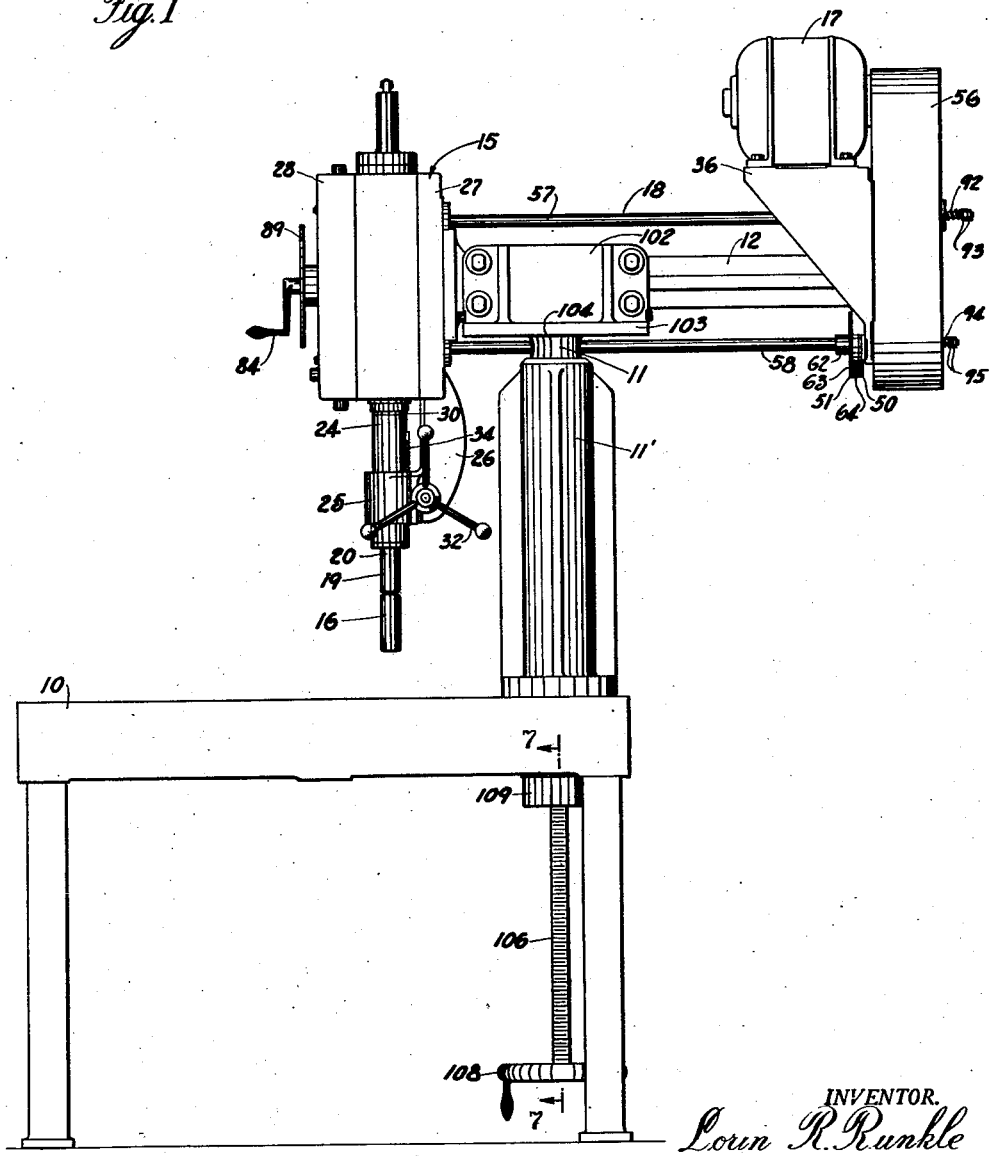
Figure 1 is a side elevational view of a stud driving machine embodying the present invention.

Referring now to the drawings, my improved stud driving machine comprises, in general, a base 10 for supporting the article to which the stud is to be applied. An upright post 11 is carried by the base 10 and is adjustable vertically relative to the base by vertical sliding and guided movement in an upright post support and guide 11'. A carriage 12 is mounted on the upper end of the post 11 for horizontal adjustment by guided horizontal sliding movement.

The stud driving apparatus, designated, in general, at 15, is mounted on the carriage 12 and comprises the stud driving member 16, driving means shown in the form of an electric motor 17, and driving connection means 18 between the driving means 17 and the stud driving member 16.

The stud driving member 16 may be detachably applied and have the usual or any suitable driven engagement with the cooperating part 19 at the lower end of the vertical shaft 20. Where the stud (not shown) is threaded at both ends, the upper threaded end may be screwed into the driving shank or member 16 in known or other suitable manner. The member 16 is adapted to be applied to the driving part 19, and may be released or detached therefrom, for example, by inserting a suitable tool through the opening shown at 21. The foregoing features may vary widely, and therefore have not been shown in detail.

The shaft 20 is journaled for rotation, for example, in bearings 22 and 23 in a tubular member 24 which has vertical sliding movement in a boss 25 at the lower end of an arm 26 depending, for example, from the inner part of a gear case 28. Gear case 28 is mounted on an enlarged part or head 27 at the adjacent end of the carriage 12. The shaft 20 moves vertically with vertical movement of the tubular member 24, its upper splined or feathered end having vertical movement through the gears and clutch members on the shaft. The upper end of the tubular member 24 is closed by a cap member 30.

The stud driving member 16 is adapted to be raised and lowered manually by means of a hand wheel 32 to bring the stud driving member into and out of position for driving the stud into the part to which it is to be applied. The hand wheel 32 is carried by the arm 26 and turns a pinion 33, which, by its meshing engagement with a rack 34 on the tubular member 24, raises and lowers the member 24 and the stud driving member 16 carried thereby; also, as a unit therewith, the shaft 20.

Mounted on the opposite end of the carriage 12 is a supporting bracket 36 having a motor supporting platform. The motor 17 is mounted on this platform, and a gear 37 is fixed on its shaft 38. The gear 37 meshes with a gear 39 fixed at 40 to a gear 41. Gears 39 and 41 are journaled at 42 on the bracket 36 for rotation in coaxial relation. Gear 41 meshes with a gear 43 fixed at 44 to the extending tubular portion of the driving part 45 of a clutch 46. A driving pulley 47 is also fixed at 44 to the tubular portion of the clutch part 45, the pulley 47 being thus fixed to turn with the gear 43.

The tubular portion of the driving part 45 of the clutch 46 is journaled for rotation at 48 in the adjacent bracket 36, and the tubular portion 49 of the driving part 50 of a second clutch 51 is also journaled for rotation in the bracket 36. A pulley 52 is fixed at 53 to the tubular portion 49 of the driving part 50 of the clutch 51, and a belt 54 is trained over the pulleys 47 and 52 and drives the pulley 52 from the pulley 47. The drive gear and belt connection between the motor shaft 38 and the driving parts 45 and 50 of the clutches 46 and 51, respectively, is enclosed in a gear case or housing 56.

Figure 4:
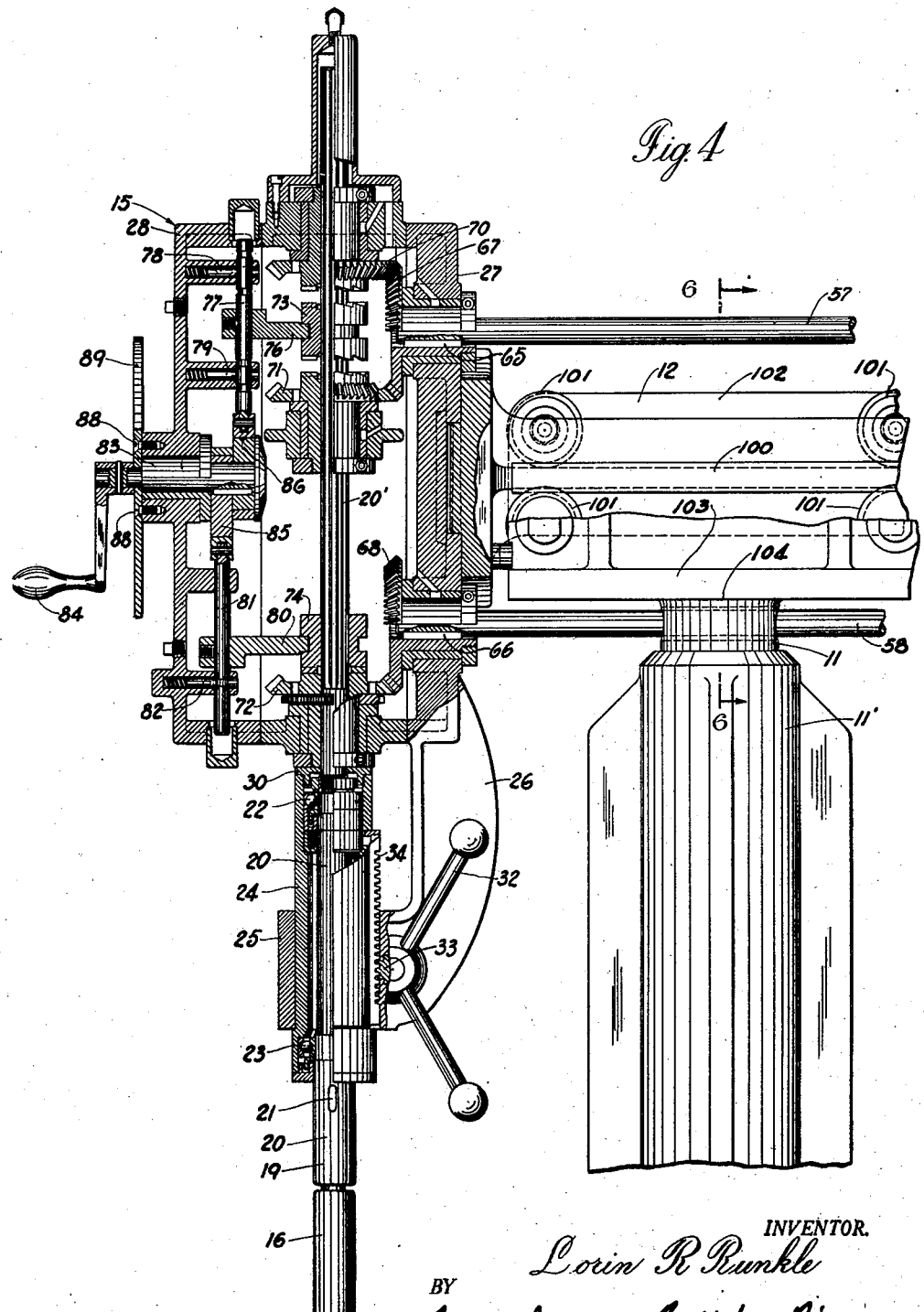
Figure 4 is a fragmentary sectional view, partially in elevation and taken substantially on the line 4—4 of Figure 2.

The driving connection means 18 includes a pair of horizontal shafts 57 and 58, one coaxial with each of the clutch parts 45 and 50. Adjacent the clutch part 45 the shaft 57 has fixed thereon, at 59, a cooperating clutch part 60 between which and the clutch part 45 a suitable friction element 61 is interposed. Adjacent the clutch part 50 the shaft 58 has fixed thereon, at 62, a cooperating clutch part 63 between which and the part 50 a suitable friction element 64 is interposed. The opposite ends of the shafts 57 and 58 are fixed at 65 and 66 to the hub portions of bevel gears 67 and 68, respectively. These gears 67 and 68 operate within the gear case 28 and have their hub portions journaled for rotation in the adjacent wall of the gear case. As shown in Figure 4, the shaft 58 extends freely through a transverse opening in the upper end of the post 11.

A pair of bevel gears 70 and 71, free on the upper splined end 20' of the vertical shaft 20, have meshing engagement with the gear 67 in diametrically opposite positions. A bevel gear 72, also free on the upper splined end 20' of the shaft 20, has meshing engagement with the gear 68.

A pair of clutch members 73 and 74, feathered or splined to turn with the upper splined end 20' of the shaft 20, are adapted for setting the machine so that the shaft 20 and, therefore, the stud driving member 16, will be driven either from the shaft 57 or from the shaft 58 selectively, as desired. The clutch element 73 is adapted to be shifted from neutral position between the gears 70 and 71, as shown in Figure 4, either upwardly into clutching engagement with a clutch part on the gear 70, or downwardly into clutching engagement with a clutch part on the gear 71, selectively to fix either of the gears 70 or 71 for rotation with the shaft 20. The clutch member 74 is adapted to be shifted upwardly out of, or downwardly into, clutching engagement with a clutch part on the gear 72 to fix this gear for rotation with the shaft 20.

The clutch member 73 is shifted to its different positions by a shifter member 76 which is actuated by a shifter rod 77 and held in its different positions by engagement of spring-pressed detents or pins 78 and 79 in annular grooves in the rod 77. The clutch member 74 is shifted to its different positions by a shifter member 80 which is actuated by a shifter rod 81 and held in set position by engagement of a spring-pressed detent or pin 82 in an annular groove in the rod 81.

For the purpose of manually setting the machine in its different positions a shaft 83 is journaled in the outer wall of the gear case 28. The outer end of this shaft 83 has a crank handle 84 fixedly secured thereto for turning the shaft 83 manually. The inner end of the shaft 83 has a pair of eccentrics 85 and 86 fixed thereon. One eccentric 85 cooperates with the adjacent end of the shifter rod 81 for shifting the clutch member 74 to its different positions by manipulation of the handle 84. The other eccentric 86 cooperates with the adjacent end of the shifter rod 77 for shifting the clutch member 73 to its different positions; also, by manipulation of the handle 84.

Secured at 88 to the adjacent wall of the gear case 28 is an indicator disc 89 which has, at 90° apart thereon, "low load," "high load," "neutral," and "reverse" markings, the significance of which will presently appear. When the handle 84 is positioned at the "low load" marking, as shown in Figure 2, the operator is apprised that the machine is set for low load drive to the stud driving member 16. When the handle 84 is positioned at the "high load" marking, the operator is apprised that the machine is set for high load drive to the stud driving member 16. When the handle 84 is positioned at the "neutral" marking, the operator is apprised that the machine is in neutral, and when the handle is positioned at the "reverse" marking, the operator is apprised that the machine is in reverse.

Figure 5:
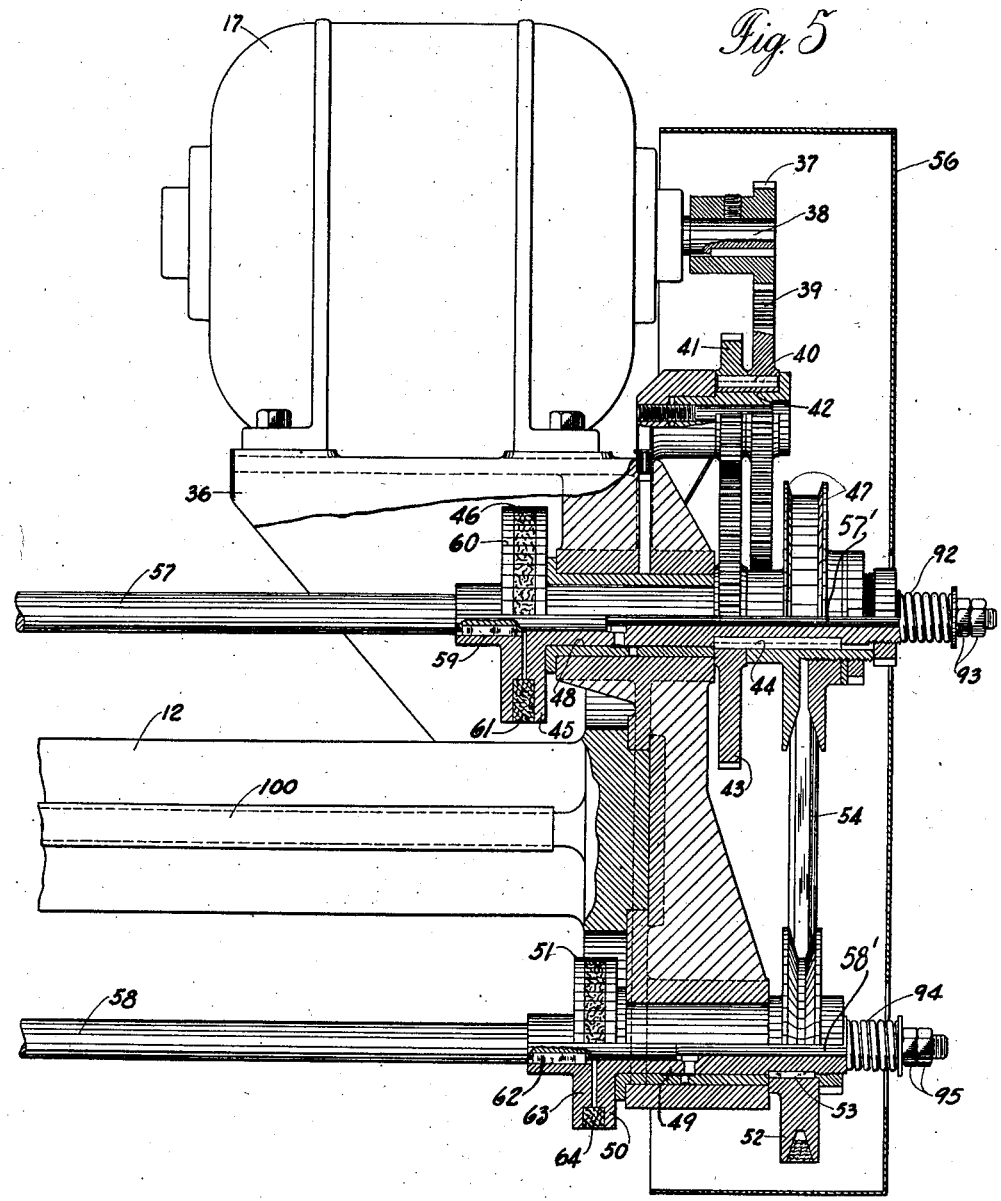
Figure 5 is a fragmentary sectional view, partially in elevation and taken substantially on the line 5—5 of Figure 3 (Figure 5, when placed to the right of Figure 4, providing a substantially complete fragmentary sectional view along substantially the line 4—4 of Figure 2)

At the right hand end of the machine as it is viewed in Figures 1 and 5, the tubular portion of the driving part 45 of the clutch 46 is provided with a coiled spring 92 disposed about the reduced shaft portion 57' of shaft 57, which coil spring 92 is tensioned by nuts 93 threaded on the outer end of the portion 57' of shaft 57 to force clutch part 45 inwardly with sufficient force to clutch the clutch part 45 to the clutch part 60 through the friction element 61 for transmission of rotation of the clutch part 45 to the clutch part 60, and thence through the shaft 57 to the stud driving member 16 when the gearing in the gear box 28 is set accordingly. The tubular portion of the driving part 50 of the clutch 51 is provided with a coil spring 94 disposed about the reduced shaft portion 58' of shaft 58 which coil spring 94 is tensioned by nuts 95 threaded on the outer end of portion 58 of shaft 58 to force the clutch part 50 inwardly with sufficient force to clutch the clutch part 50 to the clutch part 63 through the friction element 64 for transmission of rotation of the clutch part 50 to the clutch part 63, and thence through the shaft 58 to the stud driving element 16 when the gearing in the gear box 28 is set in position to transmit the drive to the stud driving element 16 through the shaft 58. The outer nut of each pair of nuts 93 and 95 is adapted for locking its spring under the tension to which it is adjusted.

In the operation of the machine, the clutch 51 is preferably loaded relatively lightly by its spring 94 so that the clutch will act, in response to the torque applied in driving the stud into place to slip when the resistance encountered by the stud is greater than the minimum resistance for securing the desired tightness of fit of the stud. If, with the handle 84 set in "low load" position to transmit the drive from the motor 17 to the stud driving member 16 through the shaft 58 and gears 68 and 72, the resistance encountered is sufficient to cause the clutch 51 to slip, then the stud does not fit its opening too loosely. If, on the other hand, the resistance to the driving of the stud is not sufficient to cause the clutch 51 to slip, then the stud does not have the desired tightness of fit in the opening to which it is applied and may be replaced by another stud.

Assuming that the clutch 51 slips and, therefore, that the stud does not fit the opening too loosely, the handle 84 is then turned to "high load" position, whereupon the drive to the stud driving member 16 is transmitted through the clutch 46, shaft 57, and gears 67 and 71. The load on the clutch 46, through its spring 92, is greater than the load on the clutch 51, so that the clutch 46 will not slip so that the stud driving member 16 is driven through the shaft 57 unless the resistance encountered by the stud in driving the same into place exceeds the desired maximum resistance. If the resistance encountered is greater than the maximum resistance for securing the desired tightness of fit of the stud, then the clutch 46 will slip and the stud driving member 16 will not be driven through the shaft 57. In that case the stud may be replaced by another stud which does not fit its opening so tightly. On the other hand, if the driving of the stud does not cause the clutch 46 to slip, then the resistance does not exceed that for securing the desired tightness of fit and the stud is driven fully into place.

When the driving of the stud is completed, the handle 84 is turned to "reverse" position (Figure 2). With the handle 84 in this position the drive is transmitted to the stud driving member 16 in the reverse direction through the clutch 46, shaft 57, gears 67 and 70, and shaft 20 to unthread the stud driving member 16 from the exposed or outer threaded end of the stud. The reverse setting of the machine may, if desired, also be used for unscrewing, from the part to which it has been applied, a stud which has been started into its hole but which fits too loosely or too tightly therein. When the handle 84 is turned to "neutral" position (Figure 2) the machine is in neutral, with the clutch member 73 in the position shown in Figure 4 and the clutch member 74 in raised position out of engagement with the clutch part on the gear 72.

I have described the clutch 51 as being preferably loaded by the spring 94 to slip when the resistance encountered by the stud in driving same into place is greater than, or approximately, the minimum resistance for securing the desired tightness of fit of the stud, and the clutch 46 as being loaded by the spring 92 to slip when the resistance encountered by the stud exceeds or is approximately the desired maximum resistance. It is to be understood, however, that loading, or relative loading, of the clutches 46 and 51 may vary widely within the broader aspects of the present invention. The nuts 93 and 95 provide simple, convenient, and effective means for adjusting the tension of the springs 92 and 94, and, thereby, the spring loading of the respective clutches 46 and 51 so that they will operate automatically to slip at any desired resistances encountered by the stud.

Figure 6:
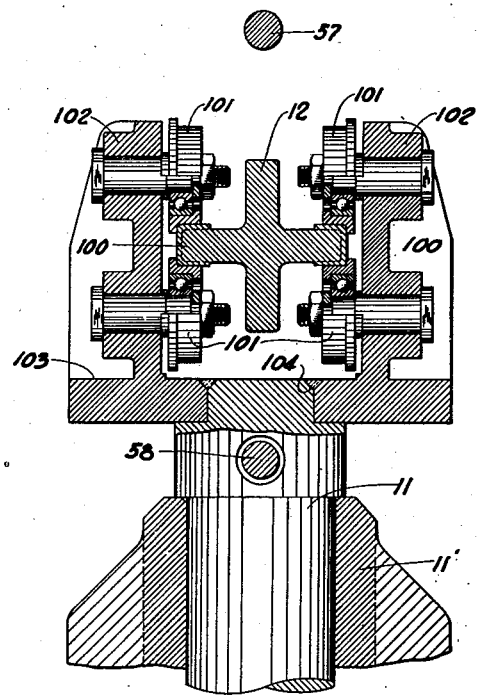
Figure 6 is a fragmentary detail section taken on the line 6—6 of Figure 4.
Figure 7:
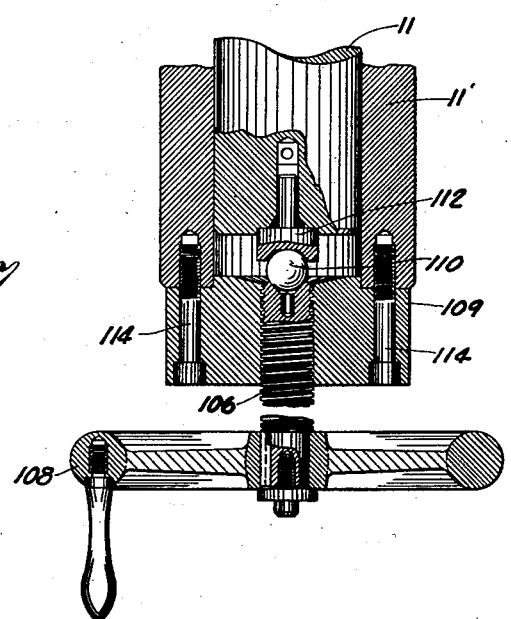
Figure 7 is a fragmentary detail section taken substantially on the line 7—7 of Figure 1.

In the illustrated embodiment of the invention, the carriage 12 has lateral guide flanges 100 (see Figures 4 and 6) which have horizontal sliding and guided movement between two pairs of guide rollers 101. The rollers 101 are journaled for rotation on the upstanding flanges 102 of the carriage carrier and guide 103 which is mounted, at 104, on the upper end of the vertically adjustable post 11. The rollers 101 are disposed between the flanges 102 which serve as guards outwardly of the rollers.

The carriage 12 and the stud driving apparatus 15 carried thereby are raised and lowered manually to raise and lower the stud driving member 16 relative to the base 10 by means of a screw 106 which extends down from the lower end of the post support 11' and has, at its lower end, a hand wheel 108 for turning the same. The upper end of the screw 106 is threaded through a cap member 109, and its inner end is recessed to seat against a ball member 110 interposed between the upper end of the screw 106 and the lower end of the post 11 and seating against a recessed ball seating member 112, the shank of which fits into an opening in the lower end of the post 11. The cap member 109 is fixedly secured by screws 114 to the lower end of the post support 11'. Turning of the hand wheel 108 in one direction raises the post 11, and turning of the hand wheel in the opposite direction lowers the upper end of the screw 106 and permits the post 11 to follow by gravity the downward movement of the screw.

The embodiment of the invention shown in the drawings is for illustrative purposes only, and it is to be expressly understood that said drawings and the accompanying specification are not to be construed as a definition of the limits or scope of the invention, reference being had to the appended claims for that purpose.

I claim:

1. In a stud driving machine, in combination, a pair of driving members, drive means for driving said driving members, a pair of driven shafts one coaxial with each other of said driving members, a pair of clutches one between each of said driven shafts and its driving member, means for loading said clutches to release at different resistances and for adjusting the resistance at which each clutch is released, a stud driving member having a splined shaft, and gear connections between said driven shafts and said last shaft and including means shiftable on said last shaft for selectively establishing driving connection between either of said driven shafts and said stud driving member.

2. In a stud driving machine, in combination, a pair of driving members, drive means for driving said driving members, a pair of driven shafts one coaxial with each of said driving members, a pair of clutches one between each of said driven shafts and its driving member, means for loading said clutches to release at different resistances and for adjusting the resistance at which each clutch is released, a stud driving member having a splined shaft, gear connections between said driven shafts and said last shaft and including means shiftable on said last shaft for selectively establishing driving connection between either of said driven shafts and said stud driving member, and means for reversing the drive to said stud driving member from one of said driven shafts.

3. In a stud driving machine, in combination, a stud driving member having a splined shaft, a pair of driving shafts, a bevel gear on each of said driving shafts, a pair of bevel gears on the splined shaft meshing with opposite sides of one of said first gears, a third bevel gear on the splined shaft meshing with the gear on the other driving shaft, and clutch means shiftable on the splined shaft for selectively rotating the splined shaft from either of the gears thereon.

4. In a stud driving machine, in combination, a stud driving member having a splined shaft, a pair of driving shafts, a bevel gear on each of said driving shafts, a pair of bevel gears on the splined shaft meshing with opposite sides of one of said first gears, a third bevel gear on the splined shaft meshing with the gear on the other driving shaft, clutch means shiftable on the splined shaft for selectively rotating the splined shaft from either of the gears thereon, and a shaft having a handle for turning same and provided with eccentrics cooperating with shifter rods provided with shifter means for shifting said clutch means by rotation of said last shaft.

5. In a stud driving machine, in combination, a stud driving member having a splined shaft, a pair of driving shafts, a bevel gear on each of said driving shafts, a pair of bevel gears on the splined shaft meshing with opposite sides of one of said first gears, a third bevel gear on the splined shaft meshing with the gear on the other driving shaft, clutch means shiftable on the splined shaft for selectively rotating the splined shaft from either of the gears thereon, a shaft having a handle for turning same and provided with eccentrics cooperating with shifter rods provided with shifter means for shifting said clutch means by rotation of said last shaft, means for driving said first mentioned pair of driving shafts, means responsive to the torque applied in driving the stud into place for disconnecting said driving means from one of said driving shafts when the resistance encountered by the stud is greater than the minimum resistance for securing the desired tightness of fit of the stud and for disconnecting said driving means from the other driving shaft when the resistance encountered by the stud exceeds the desired maximum resistance, and indicator means mounted adjacent said handle and having "low load," "high load," "neutral" and "reverse" markings thereon for indicating the setting of the machine.

LORIN R. RUNKLE.

REFERENCES CITED

The following references are of record in the file of this patent:

UNITED STATES PATENTS

| Number | Name | Date |
|---|---|---|
| 1,985,916 | Coates et al. | Jan. 1, 1935 |
| 2,297,400 | Friedrich | Sept. 29, 1942 |
| 1,463,497 | Bugatti | July 31, 1923 |
| 1,355,239 | Mann | Oct. 12, 1920 |
| 1,364,318 | Rollins | Jan. 4, 1921 |
| 815,066 | Collet | Mar. 13, 1906 |
| 2,121,075 | Eason | June 21, 1938 |
| 1,704,602 | Harney | Mar. 5, 1929 |
| 2,244,778 | Horsley | June 10, 1941 |
| 2,329,932 | Nelson | Sept. 21, 1943 |
| 2,216,563 | Cartier | Oct. 1, 1940 |
| 2,228,589 | Backes | Jan. 14, 1941 |
| 2,235,192 | Bailey | Mar. 18, 1941 |
| 2,379,878 | Bronander | July 10, 1945 |
| 2,394,386 | Husband | Feb. 5, 1946 |